Jan. 25, 1955

L. W. BRADLEY 2,700,757

SELECTIVE SWITCHING DEVICE

Filed Nov. 19, 1953

INVENTOR
LESLIE W. BRADLEY
BY P. E. Sandt
AGENT

INVENTOR
LESLIE W. BRADLEY
BY R. E. Sandt
AGENT

Jan. 25, 1955  L. W. BRADLEY  2,700,757
SELECTIVE SWITCHING DEVICE
Filed Nov. 19, 1953  4 Sheets-Sheet 3

INVENTOR
LESLIE W. BRADLEY
BY R. E. Sandt
AGENT

Jan. 25, 1955   L. W. BRADLEY   2,700,757
SELECTIVE SWITCHING DEVICE
Filed Nov. 19, 1953   4 Sheets-Sheet 4
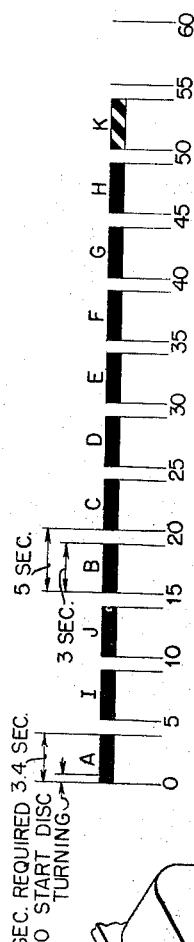
FIG. 7
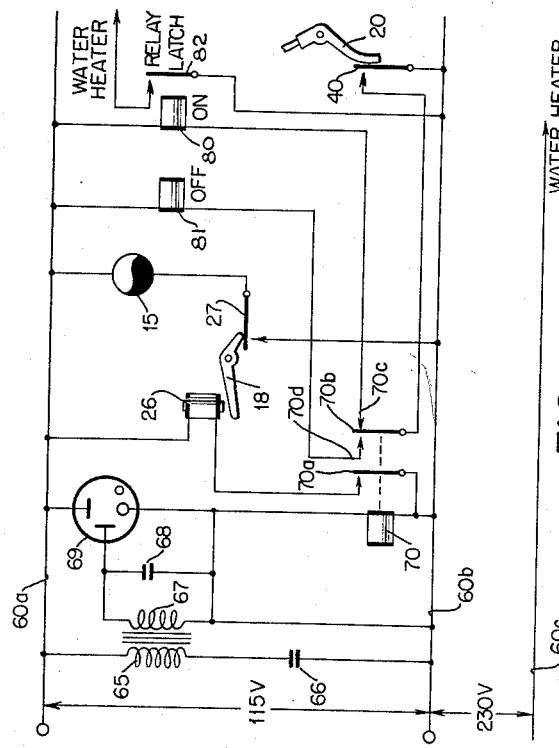
FIG. 3a   FIG. 8
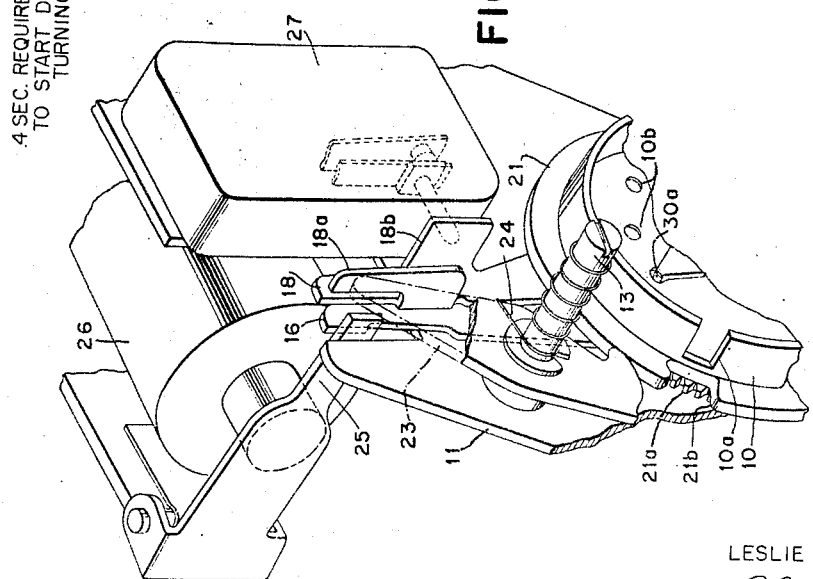
INVENTOR
LESLIE W. BRADLEY
BY R. E. Sandt
AGENT

United States Patent Office 2,700,757
Patented Jan. 25, 1955

2,700,757
SELECTIVE SWITCHING DEVICE

Leslie W. Bradley, Teaneck, N. J., assignor to International Business Machines Corporation, New York, N. Y., a corporation of New York Application November 19, 1953, Serial No. 393,154

4 Claims. (Cl. 340—164)

This invention relates to selective switching devices and more particularly to switching devices which are selectively operable responsive to a succession of electrical impulses having a predetermined timed relationship.

Although the present invention is suitable for use in any selective switching system in which it is desired to control a plurality of electrical devices by transmitted coded electrical impulses on a common signal line, it is particularly suited for the control of electric water heaters from a central power station. In a large power distribution system it is expensive to maintain generating capacity sufficient to supply the peak demands of the consumer. In the past time-controlled switches have been installed for the control of electric water heaters to disconnect the heaters during known peak periods, so as to reduce the necessary generating capacity. Varying consumer habits and the expense of resetting the necessarily sealed time units after power interruptions has required a more flexible type of control and one that requires no resetting. With the instant invention an operator at the central power station can connect or disconnect all water heaters at will according to the dictates of the generator load by transmitting the necessary high frequency timed impulses over the power distribution line.

This invention constitutes an improvement over that disclosed in the copending application of A. L. Sprecker and W. F. Henry, Serial No. 347,762 filed April 9, 1953. The instant invention preserves all of the novel features disclosed and claimed in the above application, and through the novel improvements thereto, herein described and claimed, effectively doubles the number of controlled circuits.

An object of the invention is to provide a switching device which is operated responsive to a predetermined set of timed electrical impulses to close a circuit, and which is further operated by an additional timed impulse to effect a selection of work circuits to be operated by the closed circuit.

A further object is to provide a selective switching device which is operated in response to first and second timed electrical impulses to energize one work circuit, and further operated in response to same first and second timed electrical impulses and a third timed impulse to energize a second work circuit.

A final object of the invention, and the specific object of the chosen illustrative embodiment is to provide a selective switching device operable in response to timed electrical impulses for selectively connecting an electric water heater to the power line.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3a is an isometric view of a portion of the device with the parts in the same relative position as in Fig. 3;

Fig. 7 is a chart showing the timing of the coded pulses; and

Fig. 8 is a wiring diagram of the instant device and its connection to the power line.

Figures 1, 6:
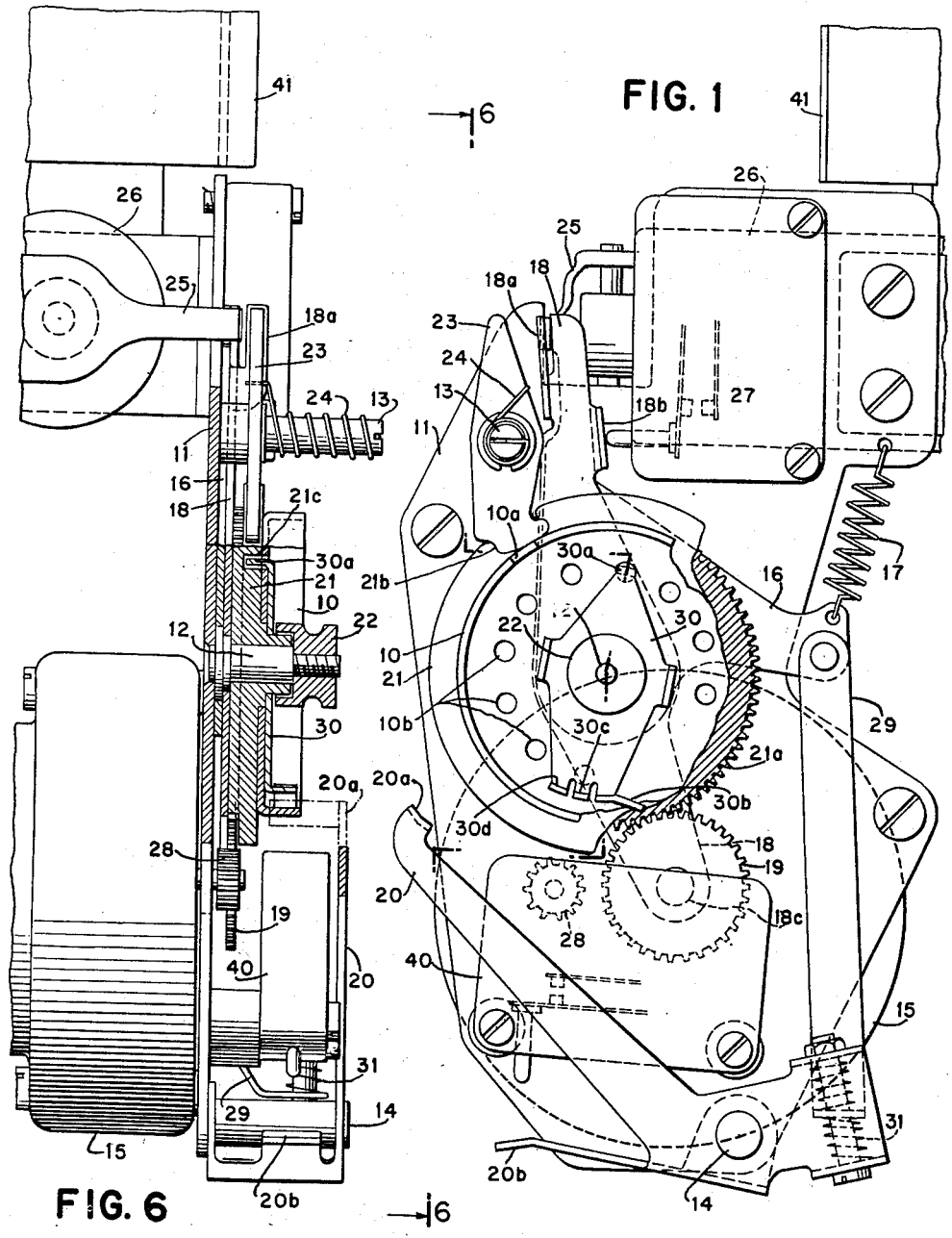
Fig. 1 is a front elevation of the switching device with certain parts broken away, the parts being shown in the initial or rest position prior to reception of any impulses.
Fig. 6 is a partial section taken along the line 6—6 in Fig. 1.

For switching operations the instant invention is connected as is shown in Fig. 8 wherein 60a, 60b, and 60c represent the conventional current supply lines of a typical residential power service. High frequency control impulses of a fixed frequency superimposed on the lines 60a and 60b are received by the tuned receiver to control the switching operation. This tuned receiver is the same as disclosed in the Wagner et al. application, Serial No. 101,884 filed June 28, 1949, now Patent No. 2,647,360, to which reference may be had for a full explanation of its operation. It is sufficient for an understanding of the operation of this invention to know that for the duration of each control impulse of the signal frequency appearing across the lines 60a and 60b, that the cold cathode gas tube 69 conducts, thus energizing the coil 70 of a relay which, when energized, operates to close the contacts 70a and operate the transfer contact 70b to break contact with 70c and make with 70d.

Referring now to Fig. 7 which shows the relative timing of the signalling impulses to which the switching device can be set to be responsive, it will be noted that the operation is of a cyclical nature, a complete cycle having a duration of one minute. The operation of the switching device requires at least two impulses having a predetermined minimum duration and a predetermined spacing in point of time. Each of a plurality of switching devices connected to a common signal line has its own code, so that only one device is actuated responsive to a given code. The "A" pulse is shown to have a duration of 3.4 seconds which duration is the minimum to which the device is responsive, as will be explained in the mechanical description thereof. The "A" impulse initiates a cycle of operation of all of the switching devices connected to the signalling line. The "B" through "J" impulses have a duration of three seconds and are spaced at five-second intervals starting five seconds after the initiation of the "A" impulse. These latter impulses are selectively transmitted according to the desired one or ones of the switching devices to be operated. The "K" impulse represents the duration of make of the local work circuit closed by the operated switching device, this "make" always occurring at a fixed time beginning at fifty seconds after the initiation of the "A" impulse. The "K" pulse also represents the timing of a further signalling impulse, to which impulse the instant invention is responsive to effect a further selection of work circuits.

Referring back to Fig. 8, if a succession of impulses timed as in Fig. 7 is received on lines 60a and 60b, the relay coil 70 will be energized thereby to initiate the operation of the mechanical structure to be described, which structure will operate and close the switch 40 at fifty seconds after the initial impulse. The presence or absence of a "K" control impulse on the signal line will determine which of the coils 80 or 81 will be energized. When the contacts 40 are closed at 50 seconds, if the "K" impulse is not transmitted, relay coil 70 will not be energized at this time, and a circuit is effected from line 60b, now closed switch 40, normally closed contacts 70b and 70c, coil 80 to line 60a thus energizing the coil 80. If the "K" impulse is transmitted at 50 seconds coincident with the closure of switch 40, the relay coil 70 will be energized transferring common contact 70b to make with contact 70d to effect a circuit from line 60b through switch 40 (now closed), contacts 70b and 70d (now closed), coil 81 to line 60a to energize the coil 81.

The coils 80 and 81 are the operating coils of a latch type relay such as that shown in U. S. Patent 2,510,604, issued June 6, 1950 to W. Pfaff. In such a relay one coil attracts a contact-operating armature which when attracted is latched in the attracted position by a mechanical latch. A second coil operates to release the latch and permit the armature to return to its unattracted position by spring tension. In Fig. 8 the coil 80 is the latch operating coil of such a relay and the coil 81 is the pickup or contact operating coil. The normally open contacts 82 are controlled by the position of the armature controlled by coil 81 and the latch and are connected in the supply line to the controlled appliance, in this instance a water heater.

With the above structure, for example, it is possible by transmitting an "A" impulse followed in timed relationship by "E" and "K" impulses to connect all water heaters having a selective switching device adjusted to be responsive to the "E" impulse. Because of the latch-type relay the heater remains connected to the line until there is transmitted an "A" impulse followed by an "E" impulse with no "K" impulse. Thus it is the "K" impulse, by its presence or absence, which determines whether the controlled circuit shall be turned off or on. Following the obvious expedient the coils 80 and 81 could be the operating media for other devices such as bells, or individual relays to cause a selective operation of two devices.

Referring now to Figs. 1 and 6, the mechanical structure for operating the switch 40 comprises basically a cup-shaped wheel 10 which rotates a complete revolution in one minute upon receipt of the initiating impulse "A" (Fig. 8), a switch lever 20 coacting therewith so that if upon receipt of the second impulse "B," or "C," or "D," etc. the notch 10a in the lip of the cup-shaped code wheel is opposite the turned-away flange 20a, the flange can pass through the lip of the cup when the switch lever 20 is magnetically rocked clockwise, and a switch-actuating cam 30 rotating with the code wheel 10 to coact with the flange 20a when it is within the cup to further rock the switch lever 20 to actuate the switch 40 to energize the local work circuit. The angular position of the notch 10a relative to the flange 20a when the device is at rest determines to which of the "B" through "H" impulses the device is responsive, in that all of the switching devices are initially set in motion by the "A" impulse. It should be noted at this time that the location of the notch 10a in the code wheel is adjustable, but that the position of the switch actuating cam 30 relative to the flange 20a is fixed so that the energization of any local work circuit always occurs fifty seconds after the beginning of the "A" impulse as is shown in Fig. 7 at "K."

The switch unit is mounted on a common base plate 11 to which are affixed pivot studs 12, 13 and 14, and the synchronous motor 15. Adjacent to the base plate 11 and pivotable on the stud 12 is a flat bellcrank 16 having an upper arm and a second arm depending to the right (as viewed in Fig. 1) to which is attached the spring 17 to bias the bellcrank in a counterclockwise direction. Adjacent to the bellcrank 16 and also pivotable on the stud 12 is the essentially flat lever 18 having two upstanding flanges 18a and 18b at its upper end and at its lower end a stud 18c upon which rotates an idler gear 19. Adjacent the lever 18 and rotatable on stud 12 is a combination cam and gear 21, the gear portion 21a thereof being in mesh with the idler gear 19, and the cam portion being essentially a disc having a cutaway portion 21b. Fitted over a hub of the cam portion of 21 are the cup-shaped code wheel 10 and the switch actuating cam 30 held in place by nut 22 threaded on the stud 12. The cup-shaped code wheel 10 has a notch 10a in the upturned lip thereof and a series of locating holes 10b in the web. The switch actuating cam 30 has a downturned flange portion 30a which passes through one of the holes 10b in the web of code wheel 10 into a socket 21c in the face of the cam gear combination 21 to fix the relativity of these parts. Thus by removing nut 22 it is possible to reposition the code wheel 10 into any one of a plurality of angular positions as determined by the spacing of the holes 10b, yet the flange 30a fixes the position of the switch actuating cam relative to the cam-gear 21. The holes 10b are spaced at 30 degree intervals inasmuch as the "B" through "H" pulses (Fig. 7) are spaced at five-second intervals and the code wheel revolves at one revolution per minute, the orientation of the holes relative to notch 10a being arranged so that the notch 10a can be positioned selectively at 90, 120, 150, 180, 210, 240 or 270 degrees from the coaction with flange 20a of switch lever 20 these positions corresponding to the code setting receptive to the "B" through "H" impulses respectively.

Pivoted on stud 13 is a rock lever 23 biased in a counterclockwise direction by spring 24, and coacting with the cutaway portion 21b of the cam and gear combination 21 to act as a detent. The upper end of rock lever 23 coacts with the upstanding flange 18a of lever 18 for a purpose to be described. Both the lever 18 and the bellcrank 16 are rocked clockwise by the attraction of the armature 25 which abuts the edges of the upper arms of both the bellcrank 16 and the lever 18. The armature 25 is attracted by the electromagnet 26 whenever a signal is impressed on the line. Clockwise rocking of lever 18 brings flange 18b into coaction with switch 27, and meshes idler gear 19 with a gear 28 on the shaft of motor 15. The clockwise rotation of bellcrank 16 through the link 29 rocks the switch lever 20 clockwise. The self-centering spring connection 31 between the link 29 and the switch lever 20 permits the switch lever 20 to follow the motion of link 29 only so long as lever 20 is free from restraint.

Referring now to Fig. 8 when a signal impulse is received the relay 70 is energized closing its points 70a as previously described. Closure of these points establishes a circuit from line 60a through magnet 26 the now closed points 70a to line 60b. Thus energized the magnet 26 rocks lever 18 (Fig. 1) clockwise to coact with and close switch 27. Thus closed, switch 27 provides an energizing circuit for motor 15 (Fig. 1).

Figure 2:
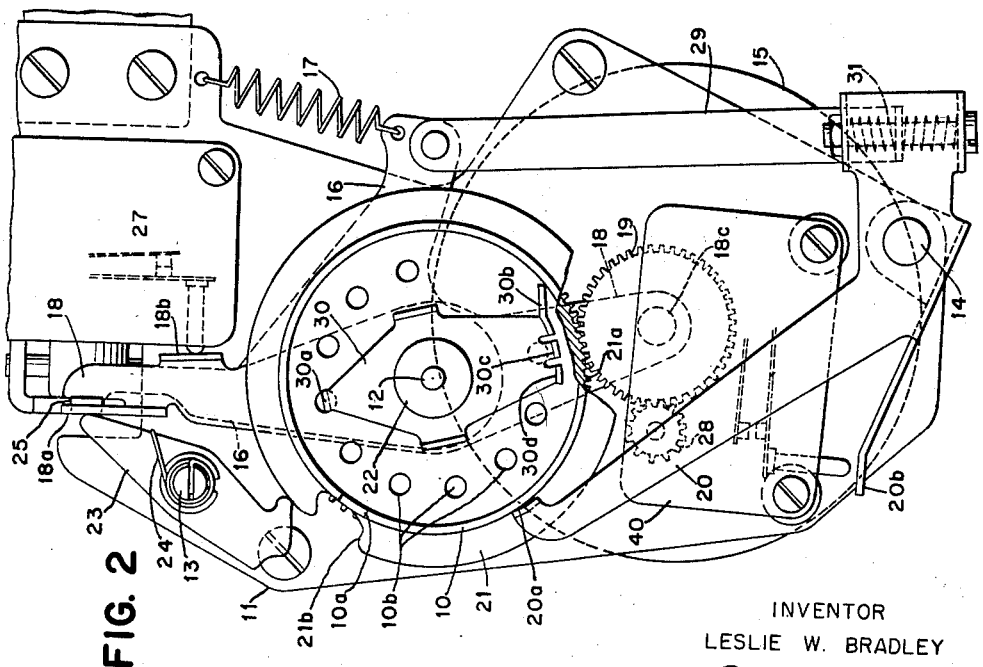
Fig. 2 is a view comparable to Fig. 1 the parts being shown in their relative position shortly before cessation of the initiating impulse.

In Fig. 1 the parts are shown in their initial or reset position with the magnet 26 deenergized. Upon energization of magnet 26 as above described the lever 18 and the bellcrank 16 will be rocked clockwise through the attraction and movement of armature 25. The rocking of lever 18 engages idler 19 with gear 28 on the shaft of motor 15, now revolving, so that a drive is transmitted from gear 28 through idler 19 to gear portion 21a of the cam gear combination 21 so that it begins to rotate counterclockwise. If the signal is of sufficient duration the assembly consisting of the cam-gear 21, code wheel 10, and switch actuating cam 30 will rotate to the position shown in Fig. 2 wherein the magnet 26 is still energized, the drive engaged and rotating, and the rock lever 23 has been cammed out of the cutaway portion 21b and rocked clockwise to bear against the upturned flange 18a of lever 18 thus holding it rocked in a clockwise direction so that the flange 18b will hold the motor switch 27 closed to maintain the motor circuit, and the gears 19 and 28 will be held in mesh. It will be noted that the bellcrank 16 is also rocked, as is the switch lever 20 whose flange 20a bears against the upturned flange of the code wheel 10, the self-centering spring connection 31 yielding to permit the link 29 to overtravel. In this position the finger 20b is inoperative to coact with switch 40 which is in the local work circuit.

Figure 3:
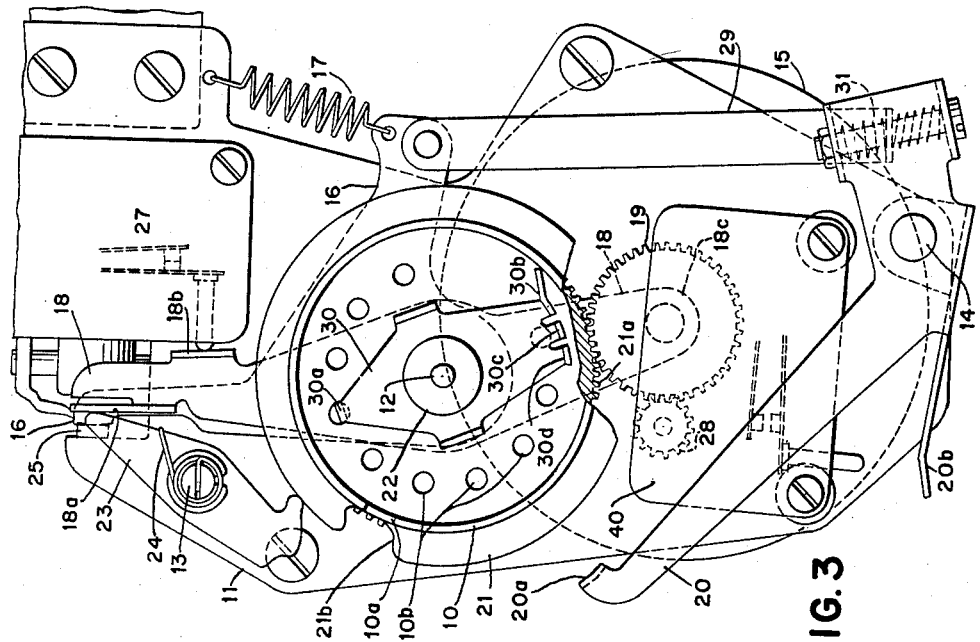
Fig. 3 is a view comparable to Figs. 1 and 2 and the parts being shown in their relative position shortly after cessation of the initiating impulse.

Upon cessation of the initiating or "A" impulse, the parts assume the position shown in Fig. 3 wherein the armature 25 is released, the bellcrank 16 rocked counterclockwise, and the rock lever 23 is held in coaction with the lever 18 to hold both the gear mesh and the motor circuit through switch 27. The relative disposition of the parts at this point in the cycle of operation is more fully shown in the perspective view of Fig. 3a wherein the coaction of armature 25, bellcrank 16, lever 18 and attendant flanges 18a and 18b, rock lever 23, and switch 27 is fully apparent.

Figure 4:
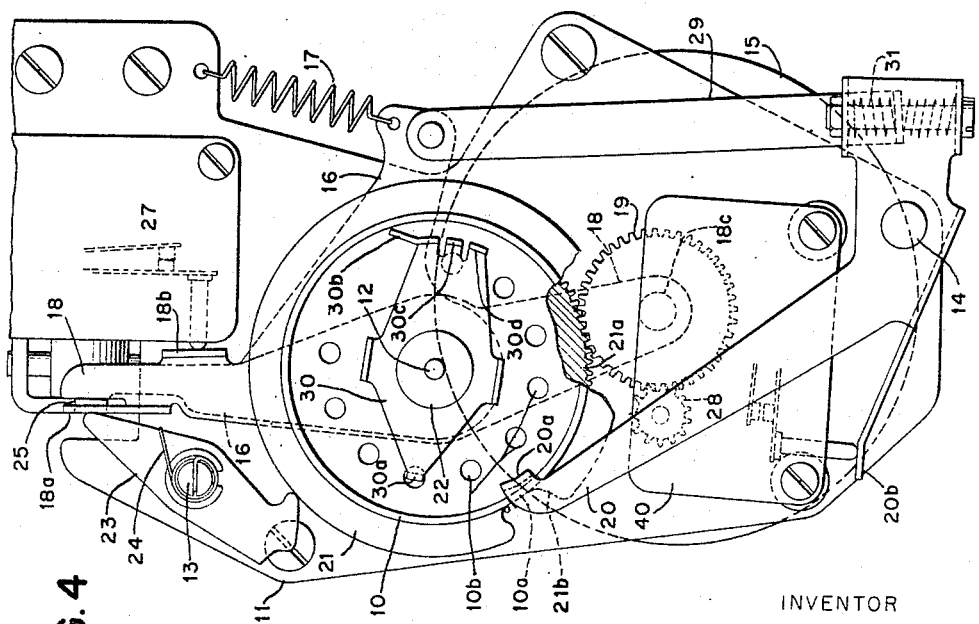
Fig. 4 is a front elevation of the device with the parts in their relative position at the time of the second impulse.

Upon receipt of a second impulse timed to the selected switching device the code wheel will have rotated to the position shown in Fig. 4 with the cutout portion 10a of the code wheel 10 opposite the flange 20a, whereupon energization of magnet 26 will rock bellcrank 16 clockwise thus rocking switch lever 20 clockwise so that the flange 20a will pass through the cutout portion 10a in the lip of the code wheel 10 and will ride on the inside of the lip during subsequent rotation thereof. It will be noted that the tab 20b of lever 20 is still inoperative to close the switch 40.

Figure 5:
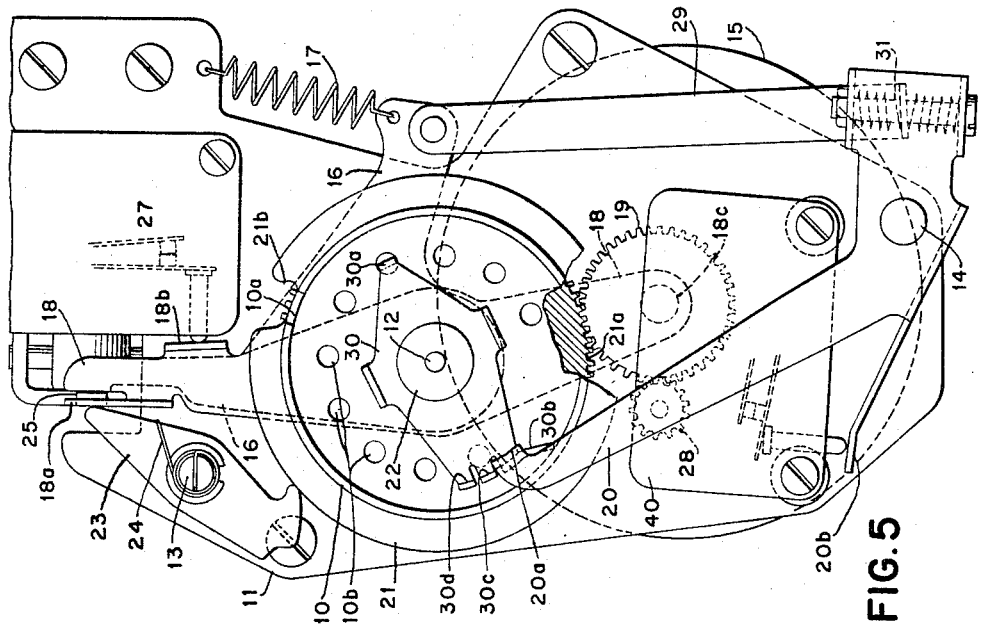
Fig. 5 is a front elevation of the device with the parts in their relative position when the local work circuit is actuated.

With the flange 20a of switch operating lever 20 on the inside of the flange of the code wheel 10, continued rotation of the code wheel will interpose the inclined surface 30b between the lip of the code wheel 10 and the flange 20a thus camming the flange 20a toward the center of the code wheel and rocking the switch operating lever 20 further clockwise so that the tab 20b coacts with the switch 40 to energize the local work circuit. In order to provide a variable duration of closing for the local work circuit, the switch operating cam 30 in addition to having the inclined surface 30b is provided with two separated upturned flanges 30c and 30d, which flanges can be broken off at the web to provide a variable drop off point for the switch operating lever 20. The inclined surface 30b alone will produce a duration of three seconds, 30b and 30c a duration of five seconds, and 30b, 30c and 30d a duration of eight seconds, the circuit always being initially closed fifty seconds after the beginning of rotation of the code wheel. For the present use the three-second duration is preferably employed. This action is shown in Fig. 5.

Further rotation of the code wheel restores the switching device to its initial position as shown in Fig. 1 except that the switch operating lever is now riding on the inner surface of the lip of code wheel 10. Upon reaching the initial or reset position the cutaway portion 21b of the cam-gear combination will be opposite the rock lever 23 so that its coacting spring 24 will rock it counter-clockwise into the cutaway portion 21b, thus allowing the lever 18 to rock counter-clockwise to demesh gears 19 and 28 and also to break the motor circuit by opening switch 27. The rock lever 23 coacting with the opening 21b acts as a detent to position and hold the rotating assembly in the initial or reset position.

An important function of the rock lever 23 and the coacting mechanism is that of filtering out spurious or unwanted signals such as transients on the line occasioned by high frequency transients generated by other pieces of electrical equipment. If, for example, a transient of essentially signal frequency were received when the switching device was in the initial or reset position, the magnet 26 will be energized and the armature 25 will be attracted as previously described. The motor 15 will be energized and the drive will be connected, also as previously described, and the cam and gear 21 will begin to rotate to rock the rock lever 23 in a clockwise direction. As the transient is less than the required minimum of 3.4 seconds the rock lever 23 will not have been sufficiently rocked to coact with the lever 18 when the energization of magnet 26 ceases due to the cessation of the transient impulse. The configuration of the cutaway portion 21b and of the rock lever 23, and the interaction of these parts with the lever 18 has been so designed that the magnet 26 must be energized for the minimum duration of 3.4 seconds in order that the cam-gear combination 21 will rotate through an angle sufficient to rock the lever 23 out of the cutaway portion 21b. If it is not so rocked the lever 18, upon cessation of the energization of the magnet 26 by an impulse of less than 3.4 seconds, will not be held in its maximum clockwise position and the motor circuit will be opened through switch 27 to stop the motor. The rock lever 23 is still in engagement with the cutout 21b and because of its spring bias will rock counter-clockwise to return the cam-gear combination to its initial or reset position, and the lever 18 under the urging of the spring inherent in the switch 27 will follow the lever 23 to break the mesh between gears 19 and 28, and the switching device will be reset to its initial position as shown in Fig. 1. Thus the switching device can be set in continuous rotation only by a signal of the predetermined minimum duration of 3.4 seconds, and will be immediately reset to the initial position upon the cessation of a signal of less than this predetermined minimum duration. This structure further prevents transient impulses from accumulating so as to add to the required 3.4 seconds and thus also cause a spurious operation of the switching device.

All of the switching devices are connected to the common power line 60a and 60b in the same fashion as the unit shown in Fig. 8, so that any signal impulses impressed thereon will affect all of the switching devices. Therefore, with the receipt of the initiating "A" impulse all of the switching devices will be set in rotation and will complete their cycle of rotation in one minute. Only the selected one or ones which are set to be receptive to the code transmitted will operate to close the local work circuit as previously described. All other of the non-selected units will have the notch 10a of the code wheel 10 in some angular position other than opposite the flange 20a of the switch operating lever 20 when the second impulse is received. If the flange 20a is outside of the lip of the code wheel 10 of these units it will be restrained from passing therethrough when so urged by the impulsing of the magnet 26 on receipt of the second impulse. If the flange is bearing on the inner surface of the lip of the code wheel the energization of the magnet 26 by the second impulse will only tend to rock the lever 20 to a position which it already occupies. At some time during the cycle however, the notch 10a will be opposite the flange 20a, and the flange 20a under the urging of the self-centering spring connection 31 will pass from the inside to the outside of the lip of the code wheel 10. Thus all units for which no corresponding code was transmitted will have their switch operating levers 20 rocked out of possible coaction with the switch operating cam 30.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a selective switching device the combination of a signal line having transmitted thereover a succession of electrical impulses having a predetermined timed relationship, means connected to said signal line and operated responsive to transmission of all of said impulses, timed impulse responsive means controlled by said line-connected means and operated responsive to the operation of said line-connected means by predetermined ones of said impulses, circuit closing means actuated at a fixed time by said timed-impulse responsive means when it is operated as a result of the transmission of the predetermined ones of said impulses, first and second electrical devices, a circuit dividing means actuated by said line-connected means and adapted to direct a circuit in one path when said line-connected means is not operated and in a second path when it is operated, and a selective energizing circuit for said first and second electrical devices including said circuit closing means said circuit dividing means and said first and second electrical devices, adapted to energize said first electrical device when said circuit closing means is operated and said line-connected means is not operated, and to energize said second electrical device when said circuit closing means is operated and said line-connected means is operated as a result of the transmission of an impulse coincident with the operation of said circuit closing device.

2. In a selective switching device, the combination of a signal line having timed electrical impulses transmitted thereover, said impulses comprising first and second impulses invariably transmitted jointly, and a selectively transmitted third timed impulse, the impulses having a predetermined timed spaced relationship, a relay coil connected to said line and energized in response to transmission of the first, second, or third impulses, contacts closed by said relay when energized, an impulse responsive device controlled by said contacts, a switch operated by said impulse responsive device, means in said impulse responsive device and operable under control of said contacts when closed as a result of the energization of said relay by the transmission of said first and second impulses to close said switch at a time coincident with the transmission of said third timed impulse on said line, transfer contacts controlled by said relay coil comprising normally open contacts and normally closed contacts adapted to be respectively closed and opened when said relay coil is energized, a first controlled device, a second controlled device, a first circuit including said first controlled device said normally closed contacts and said switch adapted when said switch is closed at the time of transmission of said third timed impulse and said relay is deenergized to cause said first controlled device to operate, and a second circuit including said controlled device, said normally open contacts and said switch adapted when said switch is closed at the time of transmission of said third timed impulse and said relay is energized as a result of the transmission of the third impulse to said relay to cause said second controlled device to operate.

3. The selective switching device as defined in claim 2 wherein the first controlled device consists of the unlatching coil of a latch-type relay, and the second controlled device consists of the pickup coil of the said latching relay.

4. In a selective switching device, the combination of a signal line having transmitted thereover electrical impulses consisting of invariably transmitted first and second impulses and a selectively transmitted third impulse each of the impulses having a predetermined time for transmission, means connected to said signal line and operated responsive to the transmission of all of said impulses, circuit energizing means controlled by said line-connected means when said line-connected means is operated responsive to the transmission of said first and second impulses to energize a circuit at a time coincident with the predetermined time for the transmission of said third impulse, first and second electrical devices, and a circuit selecting means actuated by said line-connected means and connected between said first and second electrical devices and said circuit energizing means and adapted to direct the energization to said first electrical device when said circuit energizing means is operated and said line-connected means is not operated and to direct the energization to said second electrical device when said circuit energizing means is operated coincident with the operation of said line-connected means by the transmission of said third impulse.

References Cited in the file of this patent

UNITED STATES PATENTS 2,627,063    Richards _____ Jan. 27, 1953